(12) United States Patent
Saito et al.

(10) Patent No.: US 11,616,448 B2
(45) Date of Patent: Mar. 28, 2023

(54) METHOD FOR CONTROLLING POWER CONVERSION DEVICE AND POWER CONVERSION DEVICE

(71) Applicant: NISSAN MOTOR CO., LTD., Yokohama (JP)

(72) Inventors: Kousuke Saito, Kanagawa (JP); Toshihiro Kai, Kanagawa (JP); Shigeharu Yamagami, Kanagawa (JP); Keisuke Inoue, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/440,920

(22) PCT Filed: Mar. 22, 2019

(86) PCT No.: PCT/IB2019/000313
§ 371 (c)(1),
(2) Date: Sep. 20, 2021

(87) PCT Pub. No.: WO2020/194007
PCT Pub. Date: Oct. 1, 2020

(65) Prior Publication Data
US 2022/0166342 A1     May 26, 2022

(51) Int. Cl.
*H02M 3/335*     (2006.01)
*H02M 1/32*      (2007.01)
*H02M 3/00*      (2006.01)

(52) U.S. Cl.
CPC ........ *H02M 3/33569* (2013.01); *H02M 1/32* (2013.01); *H02M 1/327* (2021.05); *H02M 3/01* (2021.05)

(58) Field of Classification Search
CPC .......... H02M 3/01; H02M 1/32; H02M 1/327
See application file for complete search history.

(56) References Cited

U.S. PATENT DOCUMENTS

| | | | |
|---|---|---|---|
| 7,576,528 B2* | 8/2009 | Wang | H02M 3/33507 323/284 |
| 9,318,944 B2* | 4/2016 | Royak | H02M 7/797 |
| 9,600,005 B2 | 3/2017 | Hayashi et al. | |
| 11,284,192 B2* | 3/2022 | Park | H02M 1/126 |

(Continued)

FOREIGN PATENT DOCUMENTS

| | | |
|---|---|---|
| CN | 104793677 A | 7/2015 |
| JP | 8-149820 A | 6/1996 |

(Continued)

*Primary Examiner* — Kyle J Moody
(74) *Attorney, Agent, or Firm* — Foley & Lardner LLP (57) ABSTRACT

A method for controlling a power conversion device can prevent over temperature by suppressing a change in impedance of a capacitor included in a rectifier circuit. The power conversion device includes an AC wave generation circuit for generating an AC wave, and a rectifier circuit for rectifying the AC wave generated by the AC wave generation circuit with a configuration including a rectifier capacitor and a diode connected in parallel. The method for controlling the power conversion device regulates the AC wave input to the rectifier capacitor depending on a change in impedance of the rectifier capacitor so as to suppress the change in the impedance of the rectifier capacitor.

10 Claims, 11 Drawing Sheets

(56) References Cited

U.S. PATENT DOCUMENTS

| | | | |
|---|---|---|---|
| 2001/0019490 A1* | 9/2001 | Igarashi | H02M 3/335 363/19 |
| 2015/0205314 A1 | 7/2015 | Hayashi et al. | |
| 2016/0308398 A1* | 10/2016 | Akuzawa | H02M 7/06 |
| 2016/0359412 A1 | 12/2016 | Kovacevic et al. | |
| 2017/0085189 A1 | 3/2017 | Madsen | |
| 2021/0159773 A1* | 5/2021 | Kai | H03F 3/2176 |

FOREIGN PATENT DOCUMENTS

| | | |
|---|---|---|
| JP | 2017-511679 A | 4/2017 |
| WO | WO 2015/087396 A1 | 6/2015 |

* cited by examiner

| | | INPUT IMPEDANCE | OUTPUT VOLTAGE | OUTPUT CURRENT |
|---|---|---|---|---|
| IMPEDANCE CHANGE | DECREASE IN IMPEDANCE | ↑ | ↓ | ↓ |
| | INCREASE IN IMPEDANCE | ↓ | ↑ | ↑ |
| LOAD FLUCTUATION | INCREASE FROM DESIGN VALUE | ↑ | ↑ | ↓ |
| | DECREASE FROM DESIGN VALUE | ↑ | ↓ | ↑ |
| | INCREASE TOWARD DESIGN VALUE | ↓ | ↑ | ↓ |
| | DECREASE TOWARD DESIGN VALUE | ↓ | ↓ | ↑ |
| INPUT FLUCTUATION | INCREASE IN INPUT VOLTAGE | → | ↑ | ↑ |
| | DECREASE IN INPUT VOLTAGE | → | ↓ | ↓ |

FIG. 18

METHOD FOR CONTROLLING POWER CONVERSION DEVICE AND POWER CONVERSION DEVICE

TECHNICAL FIELD

The present invention relates to a power conversion device including an alternating-current (AC) wave generation circuit for generating an AC wave and a rectifier circuit for rectifying the AC wave generated by the AC wave generation circuit with a configuration including a rectifier capacitor and a diode connected in parallel, and a method for controlling the power conversion device.

BACKGROUND ART

Circuits for rectifying an AC wave are known, such as a class-E rectifier circuit as disclosed in Patent Document 1.

CITATION LIST

Patent Literature

Patent Document 1: International Publication WO 2015/087396

SUMMARY OF INVENTION

Technical Problem

However, in the conventional class E-rectifier circuit described above, the capacitance value of the capacitor constituting the rectifier circuit changes depending on the temperature characteristics. For example, since the capacitance of the capacitor decreases as the temperature increases, a peak value of a voltage waveform subjected to half-wave rectification in the rectifier circuit increases in association with the decrease in the capacitance, leading to a decrease in impedance. After that, since the temperature of the capacitor rises further, the same phenomenon is repeated, and there is a problem that over temperature occurs beyond a rated temperature of components.

In view of the foregoing problem, the present invention provides a power conversion device capable of suppressing a change in impedance of a capacitor included in a rectifier circuit to prevent over temperature, and a method for controlling the power conversion device.

Technical Solution

To solve the above problem, an aspect of the present invention provides a power conversion device and a method for controlling the power conversion device configured to regulate an alternating-current wave input to a rectifier capacitor depending on a change in impedance of the rectifier capacitor so as to suppress the change in the impedance of the rectifier capacitor.

Advantageous Effects

The present invention can suppress a change in impedance of a rectifier capacitor included in a rectifier circuit to prevent over temperature in the rectifier capacitor.

DESCRIPTION OF EMBODIMENTS

[First Embodiment]

A first embodiment to which the present invention is applied is described below with reference to the drawings. The same elements illustrated with reference to the drawings are indicated by the same reference numerals, and overlapping explanations are not repeated below.

[Configuration of Power Conversion Device]

Figure 1:
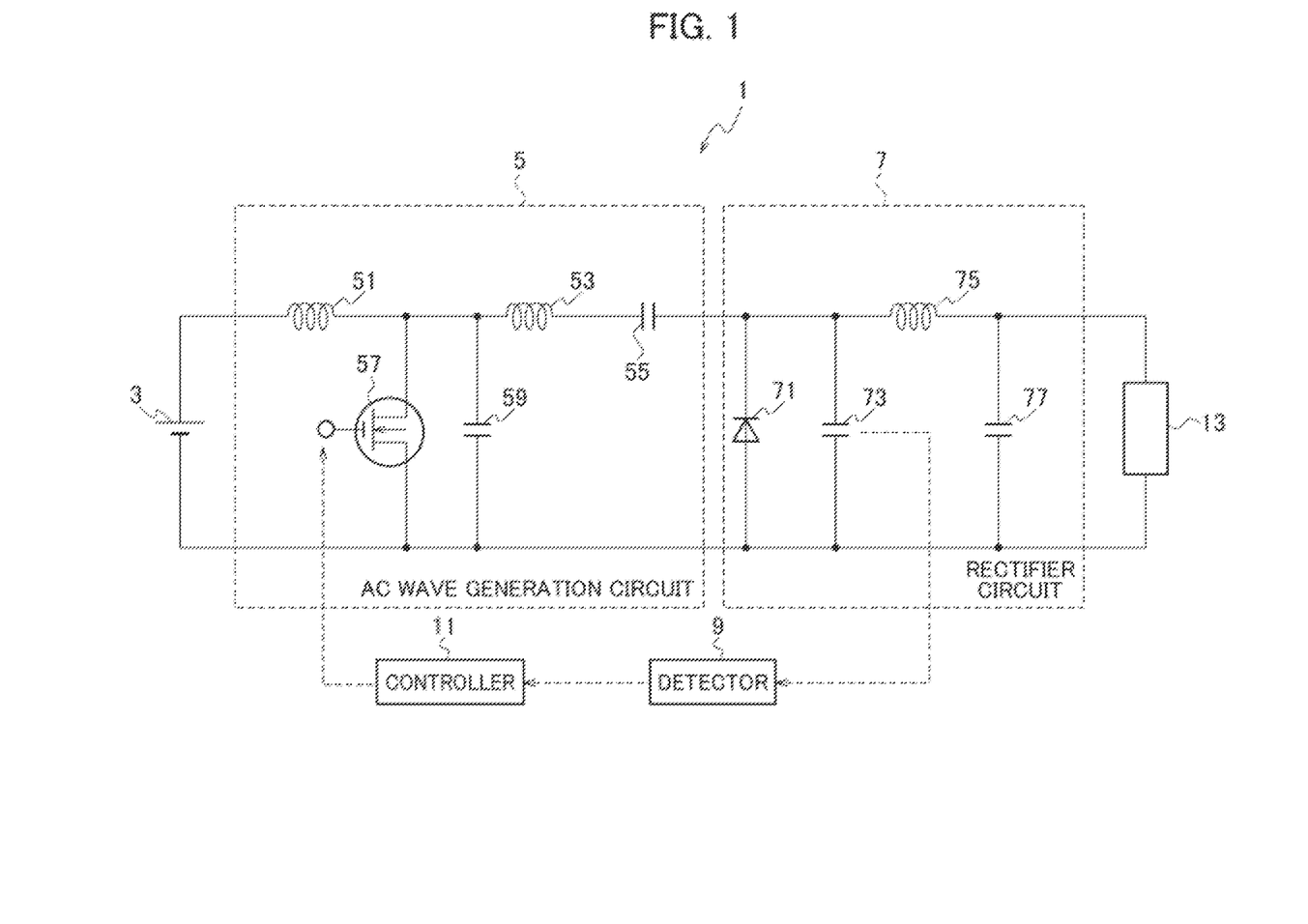
FIG. 1 is a circuit diagram illustrating a configuration of a power conversion device according to a first embodiment of the present invention.

FIG. 1 is a circuit diagram illustrating a configuration of a power conversion device according to the present embodiment. As illustrated in FIG. 1, the power conversion device 1 according to the present embodiment includes an input power supply 3, an alternating-current (AC) wave generation circuit 5, a rectifier circuit 7, a detector 9, a controller 11, and a load 13. The power conversion device 1 converts direct current (DC) power input from the input power supply 3 into AC power, and supplies DC power rectified by the rectifier circuit 7 to the load 13.

The AC wave generation circuit 5 includes a choke coil 51, a resonant coil 53, a resonant capacitor 55, a switching element 57, and a shunt capacitor 59. The AC wave generation circuit 5 is a class-E inverter circuit that generates an AC wave from the DC power from the input power supply 3 depending on a drive frequency of the switching element 57.

As illustrated in FIG. 1, the choke coil 51 is connected between the input power supply 3 and the switching element 57. The resonant coil 53 and the resonant capacitor 55 form a resonant circuit connected to a connection point between the choke coil 51 and the switching element 57. The switching element 57 turns on/off the input to the resonant circuit. The shunt capacitor 59 is connected in parallel to the switching element 57.

The rectifier circuit 7 is a class-E circuit that includes a diode 71, a rectifier capacitor 73, a filter coil 75, and a filter capacitor 77 to rectify an AC wave with a configuration in which the diode 71 and the rectifier capacitor 73 are connected in parallel.

Figure 2:
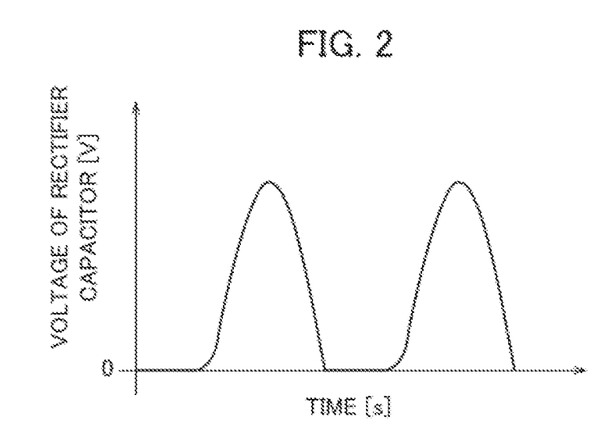
FIG. 2 is a diagram illustrating a voltage of a rectifier capacitor included in the power conversion device according to the first embodiment of the present invention.
Figure 3:
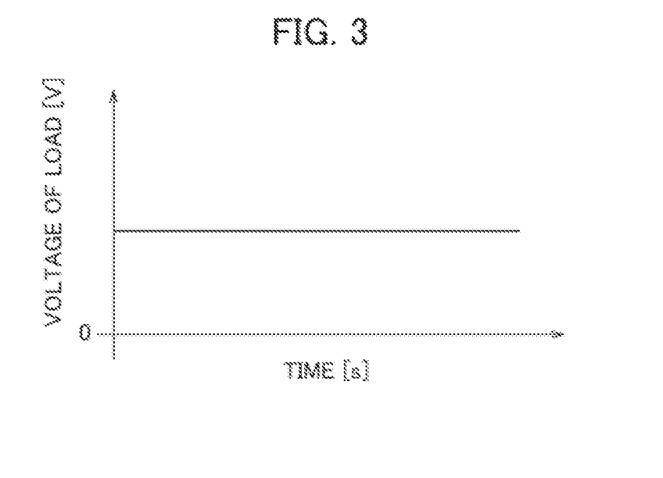
FIG. 3 is a diagram illustrating an output voltage of the power conversion device according to the first embodiment of the present invention.

The rectifier circuit 7 causes the diode 71 to subject the AC wave generated in the AC wave generation circuit 5 to half-wave rectification to charge the rectified energy to the rectifier capacitor 73. The rectifier circuit 7 transfers the charged energy to an LC filter implemented by the filter coil 75 and the filter capacitor 77 to transmit the power in a DC waveform to the load 13. As illustrated in FIG. 2, while a voltage waveform of the rectifier capacitor 73 has a shape subjected to half-wave rectification, the voltage waveform to be supplied to the load 13 via the LC filter becomes direct current, as illustrated in FIG. 3.

The detector 9 detects a change in impedance of the rectifier capacitor 73. The detector 9 detects a current value or a voltage value of the rectifier capacitor 73, and detects a degree of change in impedance of the rectifier capacitor 73 according to a change in the current value or the voltage value. The detector 9 may detect a temperature of the rectifier capacitor 73 so as to detect a degree of change in the impedance of the rectifier capacitor 73 according to a change in the temperature. The detector 9, when provided with any of an ammeter, a voltmeter, or a thermometer, may detect a change in the impedance by calculating the amount of change in the value of any of the current, the voltage, or the temperature. The impedance of the rectifier capacitor 73 has a set value set so that the power conversion device 1 can execute optimum operations. The detector 9 thus detects how much the impedance of the rectifier capacitor 73 is changed from the set value.

The controller 11 regulates the AC wave input to the rectifier capacitor 73 so as to suppress the change in the impedance of the rectifier capacitor 73, depending on the change in the impedance of the rectifier capacitor 73 detected by the detector 9. In particular, when the impedance of the rectifier capacitor 73 is increased above the set value, the controller 11 regulates the AC wave input to the rectifier capacitor 73 so as to decrease an output voltage of the power conversion device 1. When the impedance of the rectifier capacitor 73 is decreased below the set value, the controller 11 regulates the AC wave input to the rectifier capacitor 73 so as to increase the output voltage of the power conversion device 1. For example, the controller 11 changes the drive frequency of the switching element 57 to regulate a frequency of the AC wave generated in the AC wave generation circuit 5, so as to regulate the AC wave input to the rectifier capacitor 73.

The controller 11 is fabricated by a multi-purpose electronic circuit including a microcomputer, a microprocessor, and a CPU, and peripheral components such as a memory, and has a function of controlling the AC wave generation circuit 5 and the rectifier circuit 7. The respective functions of the controller 11 can be implemented in single or plural processing circuits. The respective processing circuits include a programmed processing device, such as a processing device including an electric circuit, for example, and also include an application-specific integrated circuit (ASIC) configured to execute the functions described herein, and conventional circuit components.

[Method for Controlling Power Conversion Device]

Figure 4:
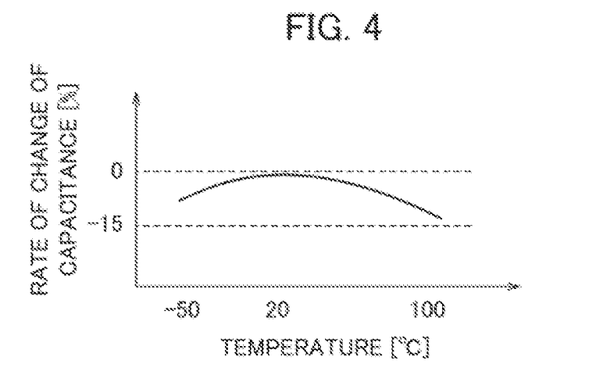
FIG. 4 is a diagram illustrating temperature characteristics of a capacitance of the rectifier capacitor included in the power conversion device according to the first embodiment of the present invention.

A method for controlling the power conversion device 1 according to the present embodiment is described below. A capacitance of the rectifier capacitor 73 included in the rectifier circuit 7 has the temperature characteristics as illustrated in FIG. 4, and a capacitance value of the rectifier capacitor 73 thus decreases as the temperature of the rectifier capacitor 73 increases.

A voltage V of the rectifier capacitor 73 is inversely proportional to a capacitance value C of the rectifier capacitor 73, as given by the following formula (1):

$$V = \frac{1}{j\omega C} I \tag{1}$$

where I is a current of the rectifier capacitor 73, $\omega=2\pi f$, and f is a frequency of an AC wave, which is the same as the drive frequency of the switching element 57.

Figure 5:
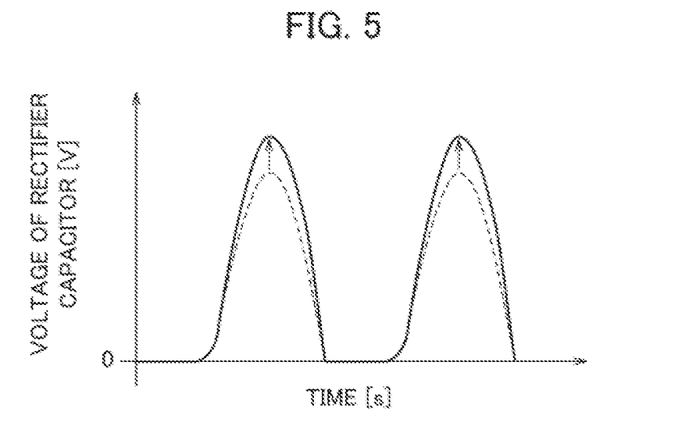
FIG. 5 is a diagram illustrating a change in voltage of the rectifier capacitor included in the power conversion device according to the first embodiment of the present invention.
Figure 6:
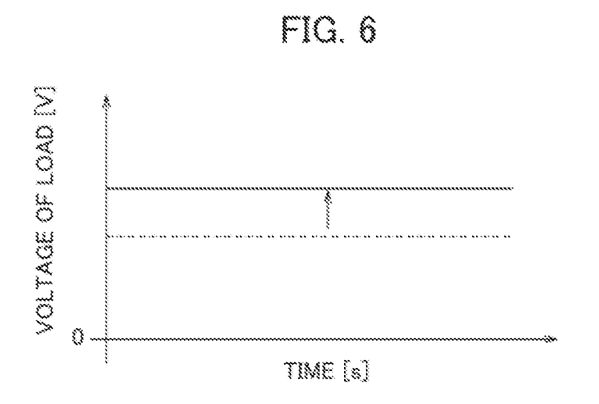
FIG. 6 is a diagram illustrating a change in the output voltage of the power conversion device according to the first embodiment of the present invention.

According to the formula (1), since the voltage V of the rectifier capacitor 73 increases as the capacitance value C of the rectifier capacitor 73 decreases, a peak value of the voltage waveform of the rectifier capacitor 73 increases in association with the decrease in the capacitance, as illustrated in FIG. 5. The output voltage of the power conversion device 1 output to the load 13 then increases, as illustrated in FIG. 6.

Figure 7:
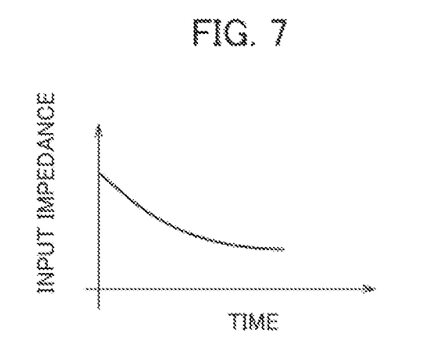
FIG. 7 is a diagram illustrating a change with time in input impedance of a conventional power conversion device.
Figure 8:
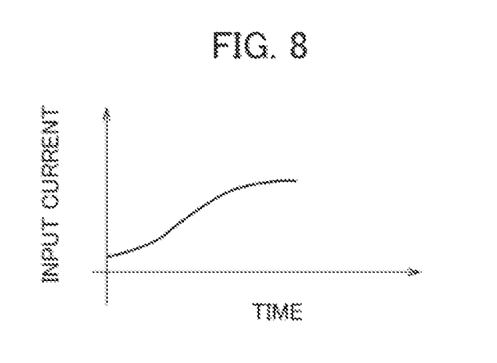
FIG. 8 is a diagram illustrating a change with time in input current of the conventional power conversion device.
Figure 9:
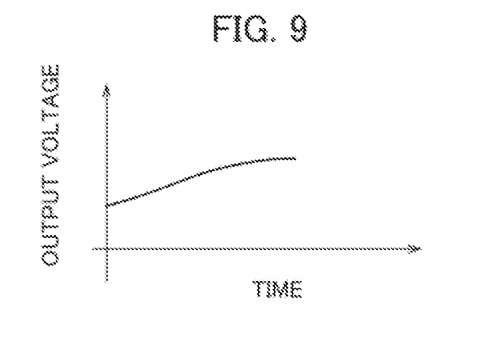
FIG. 9 is a diagram illustrating a change with time in output voltage of the conventional power conversion device.

At this time, since the input current of the power conversion device 1 also increases, an input impedance of the power conversion device 1 decreases. The temperature of the rectifier capacitor 73 further increases in association with the increase in the input current and the output voltage, and the similar phenomenon is repeated accordingly. Therefore, in the conventional case, the input impedance of the power conversion device 1 decreases with the passage of time, as illustrated in FIG. 7, and both the input current and the output voltage of the power conversion device 1 increase, as illustrated in FIG. 8 and FIG. 9. As a result, the temperature of the circuit components increases with the time, causing over temperature due to thermal runaway accordingly.

However, according to the present embodiment, the power conversion device 1 regulates the AC wave input to the rectifier capacitor 73 depending on the change in the impedance of the rectifier capacitor 73 detected by the detector 9 so as to suppress the change in the impedance of the rectifier capacitor 73. In particular, when the impedance of the rectifier capacitor 73 is increased above the set value, the controller 11 regulates the AC wave input to the rectifier capacitor 73 so as to decrease the output voltage of the power conversion device 1. On the other hand, when the impedance of the rectifier capacitor 73 is decreased below the set value, the controller 11 regulates the AC wave input to the rectifier capacitor 73 so as to increase the output voltage of the power conversion device 1.

For example, the controller 11 changes the drive frequency of the switching element 57 to regulate the frequency of the AC wave generated in the AC wave generation circuit 5, so as to regulate the AC wave input to the rectifier capacitor 73.

Figure 10:
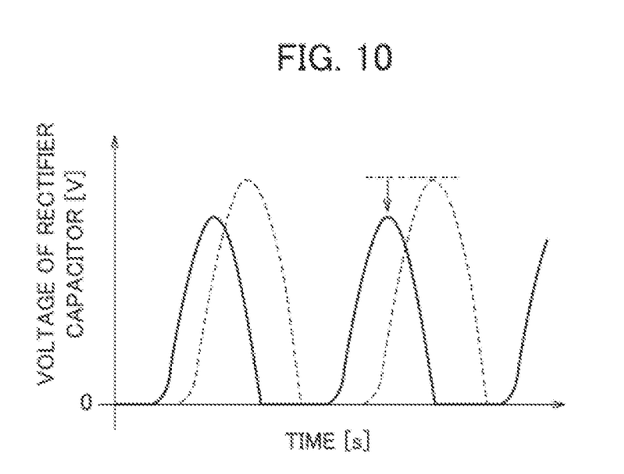
FIG. 10 is a diagram illustrating a change in voltage of the rectifier capacitor included in the power conversion device according to the first embodiment of the present invention.
Figure 11:
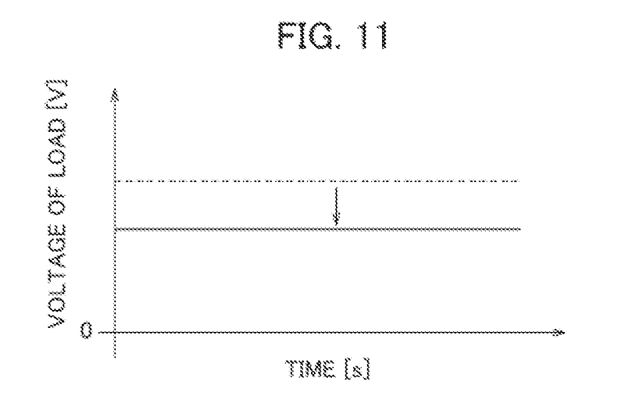
FIG. 11 is a diagram illustrating a change in the output voltage of the power conversion device according to the first embodiment of the present invention.

More particularly, when the capacitance of the rectifier capacitor 73 is decreased because of the increase in the temperature, the impedance of the rectifier capacitor 73 is increased above the set value, and the voltage of the rectifier capacitor 73 is also increased, as given by the formula (1). In this case, when the drive frequency of the switching element 57 is caused to increase above a predetermined value to increase the frequency of the AC wave generated by the AC wave generation circuit 5, the frequency of the AC wave input to the rectifier circuit 7 is also increased. As a result, the value ω in the formula (1) is then increased, and the impedance of the rectifier capacitor 73 is decreased accordingly. This leads the peak value of the voltage waveform of the rectifier capacitor 73 to be decreased as illustrated in FIG. 10, and also leads the output voltage of the power conversion device 1 output to the load 13 to be decreased as illustrated in FIG. 11. The predetermined value set for the drive frequency may be a frequency obtained upon the execution of an optimum operation so that the load 13 has a design value.

When the capacitance of the rectifier capacitor 73 is increased because of the decrease in the temperature, the impedance of the rectifier capacitor 73 is decreased below the set value, and the voltage of the rectifier capacitor 73 is also decreased, as given by the formula (1). In this case, when the drive frequency of the switching element 57 is caused to decrease below the predetermined value to decrease the frequency of the AC wave generated by the AC wave generation circuit 5, the frequency of the AC wave input to the rectifier circuit 7 is also decreased. As a result, the value ω in the formula (1) is then decreased, and the impedance of the rectifier capacitor 73 is increased accordingly. This leads the peak value of the voltage waveform of the rectifier capacitor 73 to be increased, and also leads the output voltage of the power conversion device 1 output to the load 13 to be increased.

As described above, regulating the frequency of the AC wave input to the rectifier capacitor 73 suppresses the change in the impedance of the rectifier capacitor 73. This can control the input impedance, the input current, and the output voltage of the power conversion device 1 each to be constant, so as to prevent over temperature of the components caused by thermal runaway.

If the drive frequency of the switching element 57 is increased, a switching loss is increased. In view of this, the AC wave generation circuit 5 is the class-E inverter circuit that can achieve zero-voltage switching (ZVS) due to voltage resonance, so as to greatly suppress the switching loss. This can reduce the influence which increases the drive frequency to a small level accordingly.

The rectifier circuit 7 according to the present embodiment is the class-E circuit in which the diode 71 and the rectifier capacitor 73 are connected in parallel. However, other rectifier circuits, such as full-wave rectifier circuits with diode, do not have a rectifier capacitor to charge energy. The rectifier circuit 7 thus does not cause a change in the output voltage, the input current, or the input impedance because of a change in the temperature of the rectifier capacitor, so as to prevent over temperature that is the problem to be solved by the present embodiment.

While typical snubber circuits also employ a configuration in which a diode and a capacitor are connected in parallel, the snubber circuits execute an operation of absorbing a surge voltage derived from high-speed switching by the capacitor, and thus have a different function from the rectifier circuit 7 according to the present embodiment.

The AC wave generation circuit 5 may have any configuration that generates and outputs the AC wave, instead of the configuration illustrated in FIG. 1, and may be a resonant circuit including a plurality of switches, such as a class-D inverter circuit. The filter of the rectifier circuit 7 is not limited to the LC filter, and may have any structure. In addition, a transformer for isolation may be arranged between the AC wave generation circuit 5 and the rectifier circuit 7.

[Effects of First Embodiment]

As described in detail above, the power conversion device 1 according to the present embodiment regulates the AC wave input to the rectifier capacitor 73 so as to suppress a change in the impedance of the rectifier capacitor 73, depending on the change in the impedance of the rectifier capacitor 73. This can suppress the change in the input current, the output voltage, and the input impedance of the power conversion device 1, so as to prevent over temperature of the rectifier capacitor 73.

The power conversion device 1 according to the present embodiment regulates the AC wave input to the rectifier capacitor 73 so as to decrease the output voltage of the power conversion device 1 when the impedance of the rectifier capacitor 73 is increased above the set value. The power conversion device 1 regulates the AC wave input to the rectifier capacitor 73 so as to increase the output voltage of the power conversion device 1 when the impedance of the rectifier capacitor 73 is decreased below the set value. Thus the power conversion device 1 can suppress the change in the impedance of the rectifier capacitor 73, so as to prevent over temperature of the rectifier capacitor 73.

The power conversion device 1 according to the present embodiment increases the frequency of the AC wave generated by the AC wave generation circuit 5 when the impedance of the rectifier capacitor 73 is increased above the set value. The power conversion device 1 decreases the frequency of the AC wave generated by the AC wave generation circuit 5 when the impedance of the rectifier capacitor 73 is decreased below the set value. The power conversion device 1 can suppress the change in the impedance of the rectifier capacitor 73 by regulating the frequency of the AC wave input to the rectifier capacitor 73, so as to prevent over temperature of the rectifier capacitor 73.

The power conversion device 1 according to the present embodiment detects the change in the impedance of the rectifier capacitor 73. Since the power conversion device 1 directly detects the change in the impedance of the rectifier capacitor 73, the power conversion device 1 can immediately suppress the change in the impedance of the rectifier capacitor 73, so as to prevent over temperature of the rectifier capacitor 73 with a high accuracy.

The power conversion device 1 according to the present embodiment includes the AC wave generation circuit 5 that includes the resonant circuit including the resonant coil 53 and the resonant capacitor 55, and the switching element 57 that turns on/off the input to the resonant circuit. Thus, the power conversion device 1 can easily regulate the AC wave input to the rectifier capacitor 73 by regulating the drive frequency of the switching element 57. This can suppress the change in the impedance of the rectifier capacitor 73, so as to prevent over temperature of the rectifier capacitor 73.

The power conversion device 1 according to the present embodiment includes the AC wave generation circuit 5 that further includes the choke coil 51 connected between the input power supply 3 and the switching element 57, and the shunt capacitor 59 connected in parallel to the switching element 57. The resonant circuit is connected to the connection point between the choke coil 51 and the switching element 57. Since the AC wave generation circuit 5 can be implemented as the class-E inverter circuit, a switching loss can be reduced to a small level. This can not only suppress an influence caused by an increase in switching loss upon the increase in the drive frequency of the switching element 57 but also prevent over temperature of the rectifier capacitor 73.

[Second Embodiment]

A second embodiment to which the present invention is applied is described below with reference to the drawings. The same elements illustrated with reference to the drawings are indicated by the same reference numerals, and overlapping explanations are not repeated below.

[Configuration of Power Conversion Device]

Figure 12:
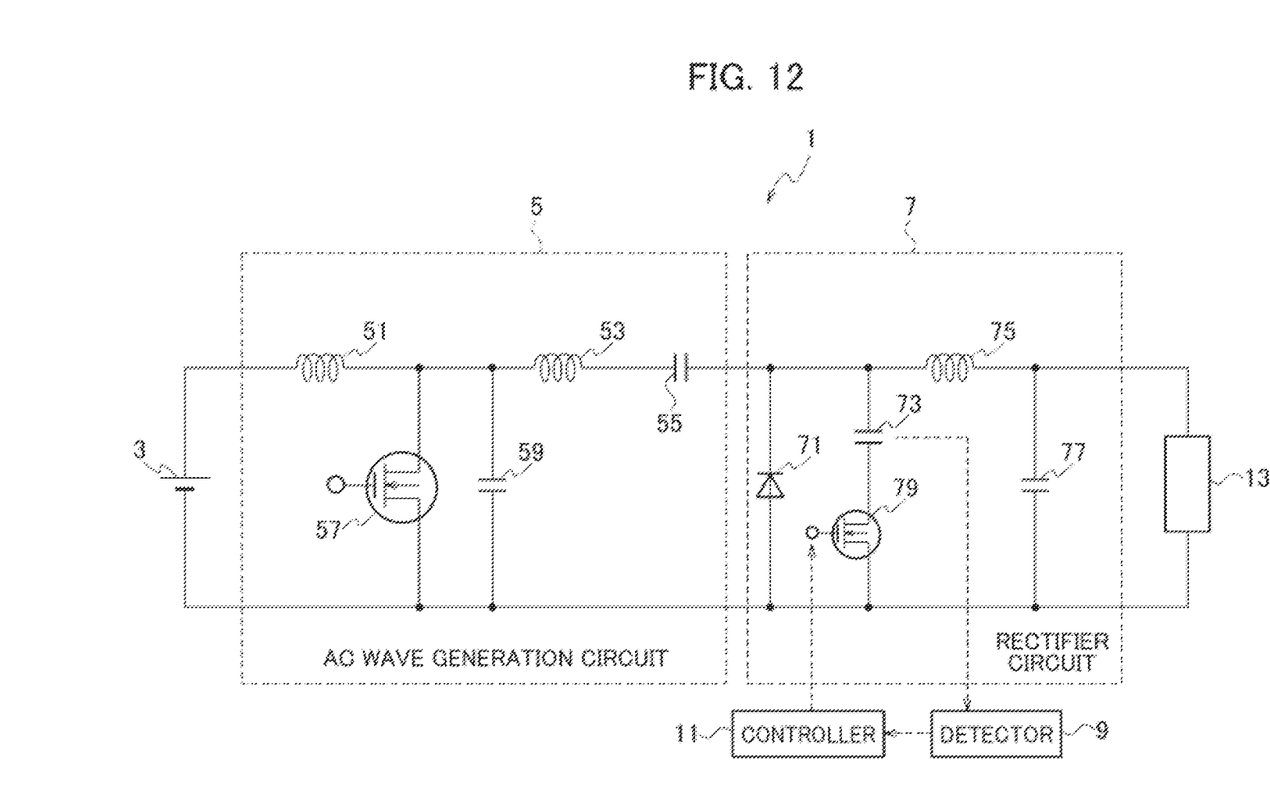
FIG. 12 is a circuit diagram illustrating a configuration of a power conversion device according to a second embodiment of the present invention.

FIG. 12 is a circuit diagram illustrating a configuration of a power conversion device according to the present embodiment. As illustrated in FIG. 12, the power conversion device 1 according to the present embodiment differs from the first embodiment in further including a rectifier switch 79 as a switching element which turns on/off the AC wave input to the rectifier capacitor 73. The rectifier switch 79 is connected in series to the rectifier capacitor 73.

[Method for Controlling Power Conversion Device]

A method for controlling the power conversion device 1 according to the present embodiment is described below. According to the present embodiment, when the detector 9 detects a change in the impedance of the rectifier capacitor 73, the controller 11 controls the on/off operation of the rectifier switch 79 so as to regulate the AC wave input to the rectifier capacitor 73.

In particular, when the impedance of the rectifier capacitor 73 is increased above the set value, the controller 11 controls the rectifier switch 79 so as to decrease the period of time during which the AC wave is input to the rectifier capacitor 37. When the impedance of the rectifier capacitor 73 is decreased below the set value, the controller 11 controls the rectifier switch 79 so as to increase the period of time during which the AC wave is input to the rectifier capacitor 37.

Figure 13:
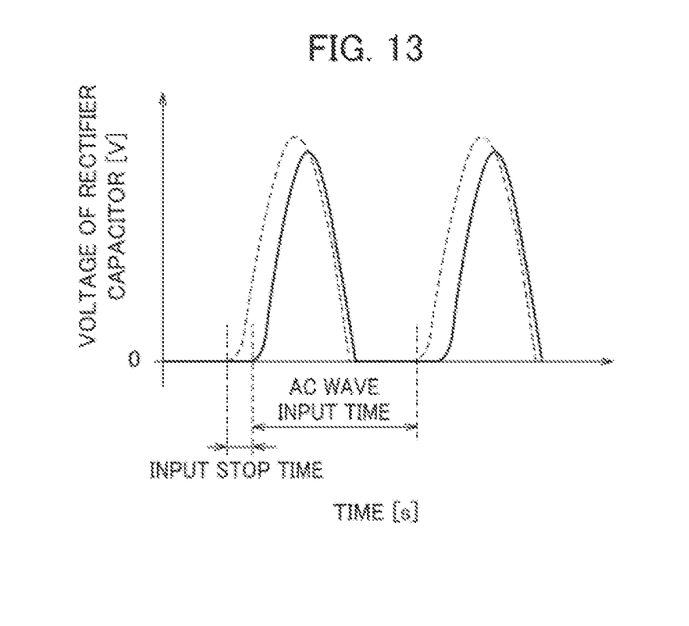
FIG. 13 is a diagram illustrating a change in voltage of a rectifier capacitor included in the power conversion device according to the second embodiment of the present invention.
Figure 14:
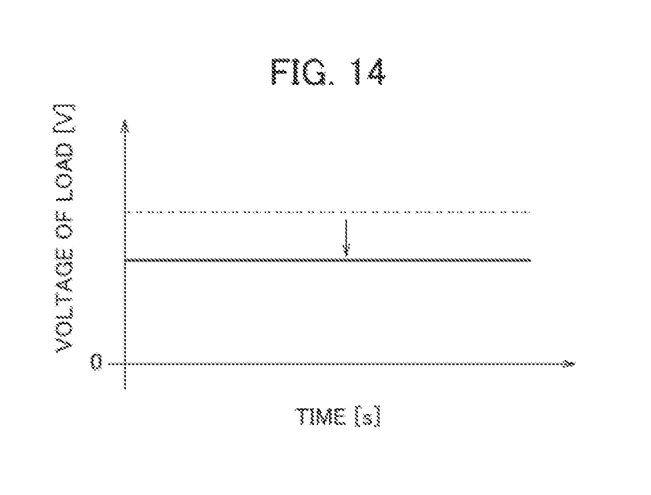
FIG. 14 is a diagram illustrating a change in output voltage of the power conversion device according to the second embodiment of the present invention.

For example, when the capacitance of the rectifier capacitor 73 is decreased in association with an increase in the temperature of the rectifier capacitor 73, the impedance of the rectifier capacitor 73 is increased as given by the formula (1), and the voltage of the rectifier capacitor 73 is increased. In this case, an input stop period is provided at a point at which the voltage of the rectifier capacitor 73 starts increasing as illustrated in FIG. 13. The input stop period is a period during which the rectifier switch 79 is turned off so as not to input the AC wave to the rectifier capacitor 73. After this period, the rectifier switch 79 is turned on so as to input the AC wave to the rectifier capacitor 73 (an AC wave input period). The AC wave input period is shorter as the input stop period is set to be longer, so as to set the period of time during which the AC wave is input to the rectifier capacitor 73 to be shorter than a predetermined time. The power to be charged to the rectifier capacitor 73 is thus reduced, so as to decrease the output voltage of the power conversion device 1 output to the load 13, as illustrated in FIG. 14. The predetermined time may be set to a time upon the execution of an optimum operation so that the load 13 has a design value.

When the capacitance of the rectifier capacitor 73 is increased in association with a decrease in the temperature of the rectifier capacitor 73, the impedance of the rectifier capacitor 73 is decreased as given by the formula (1), and the voltage of the rectifier capacitor 73 is decreased. In this case, the input stop period as illustrated in FIG. 13 is decreased so as to set the period of time during which the AC wave is input to the rectifier capacitor 73 to be longer than the predetermined time. The power to be charged to the rectifier capacitor 73 is thus increased, so as to increase the output voltage of the power conversion device 1 output to the load 13.

Figure 15:
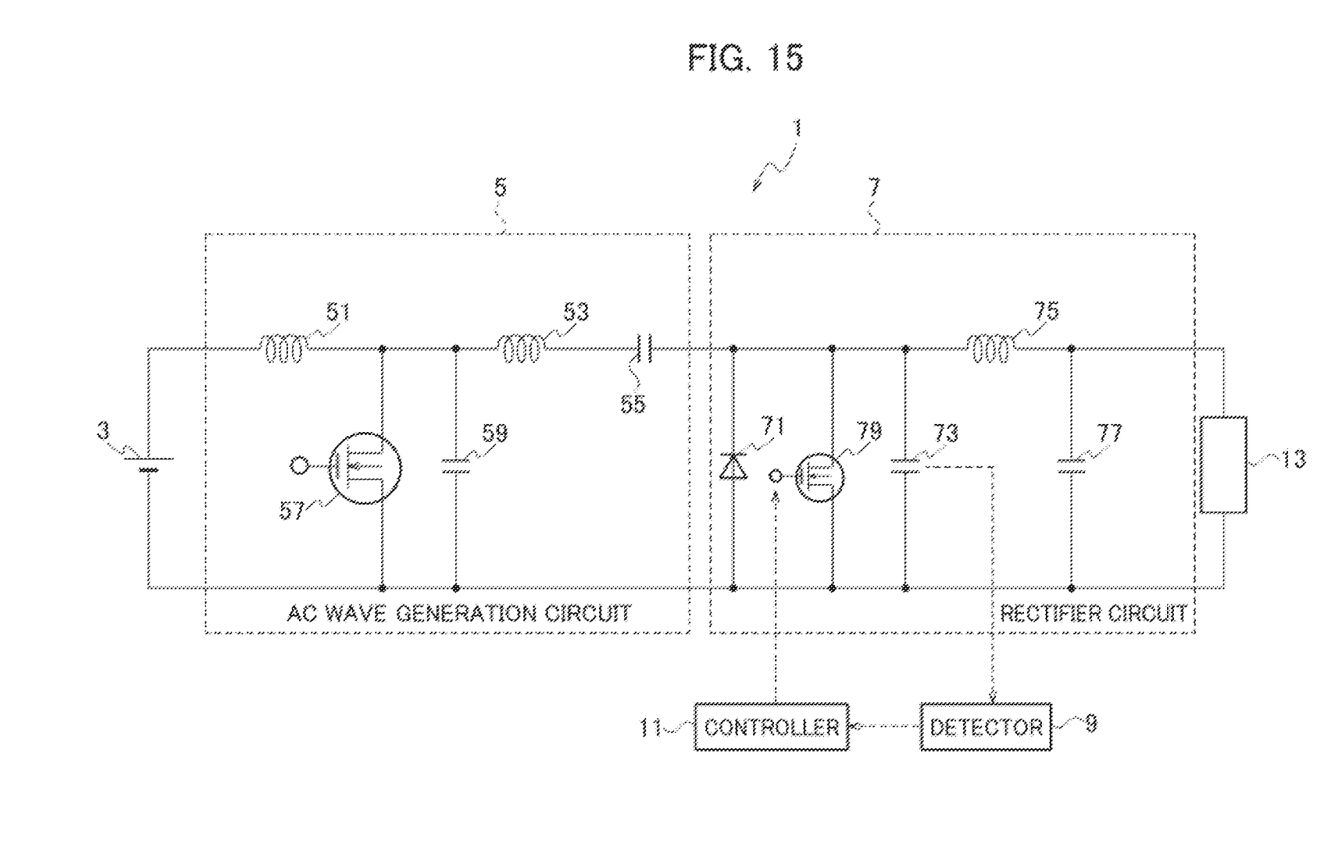
FIG. 15 is a circuit diagram illustrating a configuration of the power conversion device according to the second embodiment of the present invention.

The rectifier switch 79 may be connected in parallel to the rectifier capacitor 73, as illustrated in FIG. 15. In this case, the operation of turning on/off the rectifier switch 79 is controlled reversely to the case of being connected in series as illustrated in FIG. 12. In particular, when the rectifier switch 79 is connected in parallel to the rectifier capacitor 73, by turning on the rectifier switch 79, the input stop period during which the AC wave is not input to the rectifier capacitor 73 is set. The AC wave is input to the rectifier capacitor 73 when the rectifier switch 79 is turned off.

[Effects of Second Embodiment]

As described above, the power conversion device 1 according to the present embodiment decreases the period of time during which the AC wave is input to the rectifier capacitor 73 when the impedance of the rectifier capacitor 73 is increased above the set value. The power conversion device 1 increases the period of time during which the AC wave is input to the rectifier capacitor 73 when the impedance of the rectifier capacitor 73 is decreased below the set value. The power conversion device 1 can suppress the change in the impedance of the rectifier capacitor 73 by regulating the period of time during which the AC wave is input to the rectifier capacitor 73. As a result, the power conversion device 1 can prevent over temperature of the rectifier capacitor 73.

[Third Embodiment]

A third embodiment to which the present invention is applied is described below with reference to the drawings. The same elements illustrated with reference to the drawings are indicated by the same reference numerals, and overlapping explanations are not repeated below.

[Configuration of Power Conversion Device]

Figure 16:
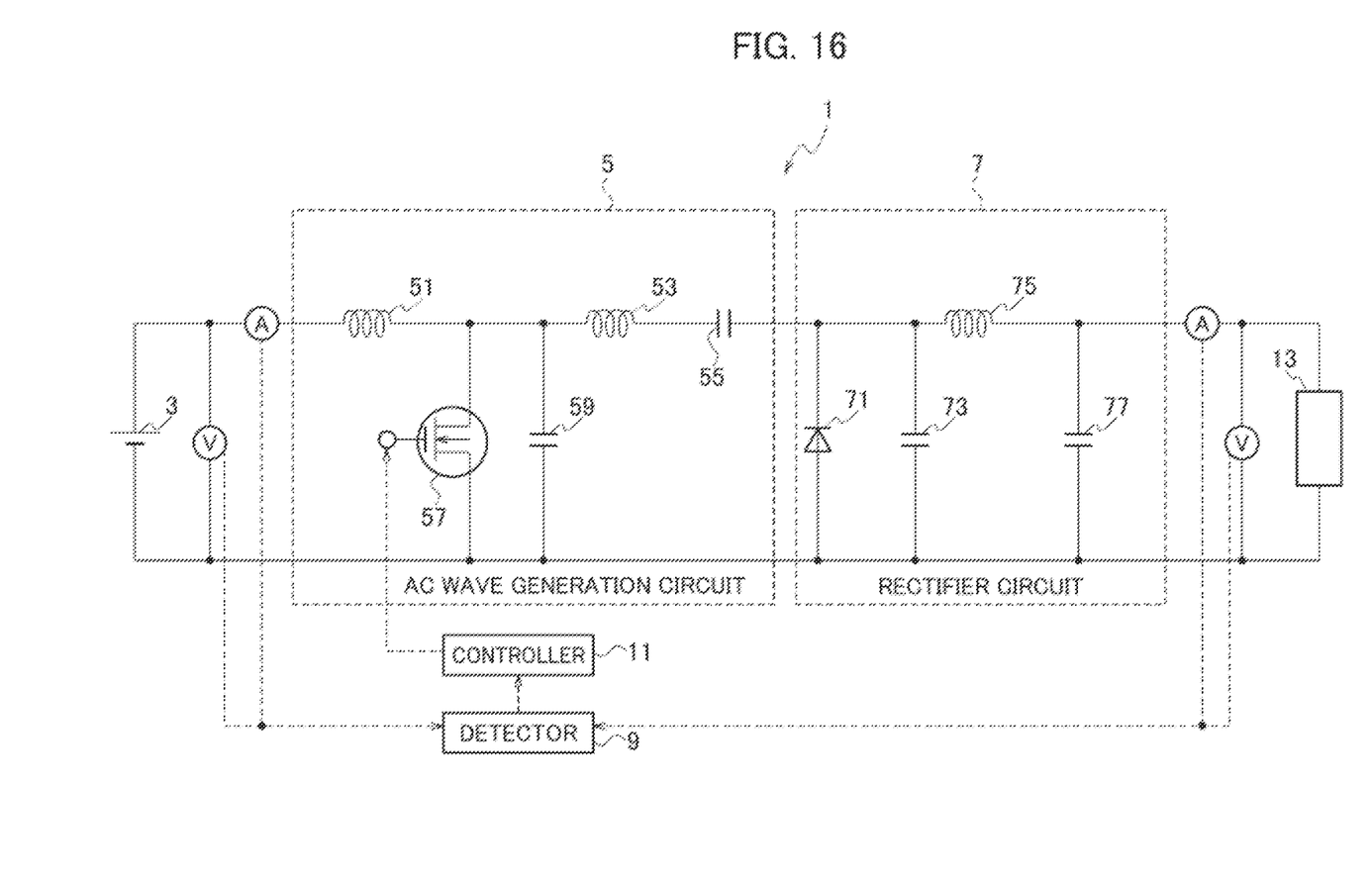
FIG. 16 is a circuit diagram illustrating a configuration of a power conversion device according to a third embodiment of the present invention.

FIG. 16 is a circuit diagram illustrating a configuration of a power conversion device according to the present embodiment. As illustrated in FIG. 16, the power conversion device 1 according to the present embodiment differs from the first and second embodiments in detecting an input voltage, an input current, an output voltage, and an output current of the power conversion device 1. The detector 9 detects the input voltage Vi, the input current Ii, the output voltage Vo, and the output current Io of the power conversion device 1, instead of the change in the impedance of the rectifier capacitor 73. Since a typical power conversion device detects an input voltage, an input current, an output voltage, and an output current, these values may be detected by a general method such as installing a voltmeter or an ammeter in this embodiment.

[Method for Controlling Power Conversion Device]

A method for controlling the power conversion device 1 according to the present embodiment is described below. According to the present embodiment, the power conversion device 1 is controlled based on the input voltage Vi, the input current Ii, the output voltage Vo, and the output current Io of the power conversion device 1. In particular, the controller 11 first acquires the input voltage Vi, the input current Ii, the output voltage Vo, and the output current Io from the detector 9, and calculates an input impedance Zi according to the following formula (2):

$$Zi=Vi/Ii \qquad (2)$$

Figure 17:
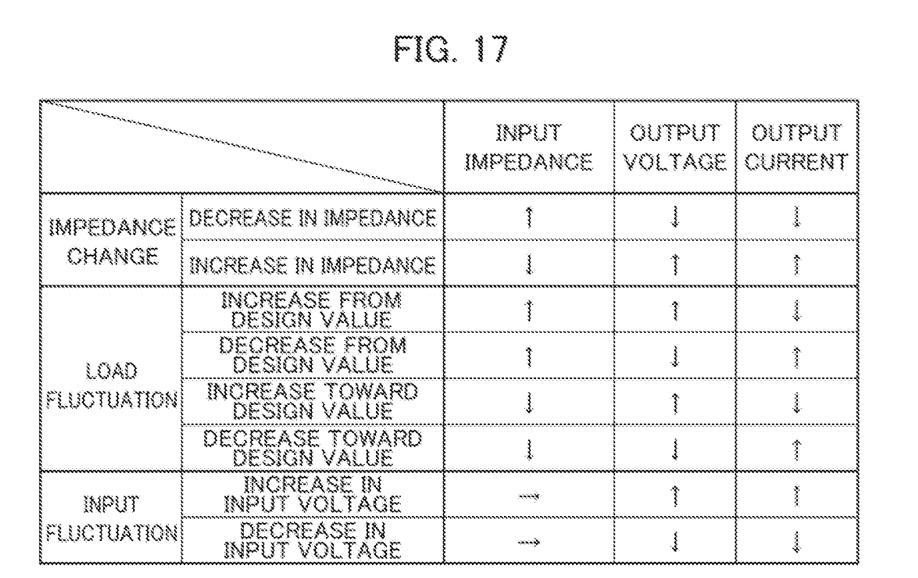
FIG. 17 is a diagram for explaining a method of determining a change in impedance of a rectifier capacitor included in the power conversion device according to the third embodiment of the present invention.

After calculating the input impedance Zi, The controller 11 determines whether the impedance of the rectifier capacitor 73 is increased above the set value or decreased below the set value, while referring to a table as illustrated in FIG. 17. FIG. 17 illustrates upward arrows indicating an increase, downward arrows indicating a decrease, and sideways arrows indicating no change.

As illustrated in FIG. 17, when the input impedance Zi is decreased below the set value, and the output voltage Vo and the output current Io are increased above the set value, the controller 11 determines that the capacitance of the rectifier capacitor 73 is decreased and the impedance is increased above the set value. When the input impedance Zi is increased above the set value, and the output voltage Vo and the output current Io are decreased below the set value, the controller 11 determines that the capacitance of the rectifier capacitor 73 is increased and the impedance is decreased below the set value. The set value for each of the input impedance, the output voltage, and the output current is a value when the power conversion device 1 executes an optimum operation.

When a change in the input/output power of the power conversion device 1 is caused, not only a change in the capacitance of the rectifier capacitor 73 but also a fluctuation in the load 13 and the input voltage are presumed. Therefore, the controller 11 distinguishes between the case where the load 13 fluctuates and the case where the input voltage fluctuates based on the input impedance Zi, the output voltage Vo, and the output current Io.

Figure 18:
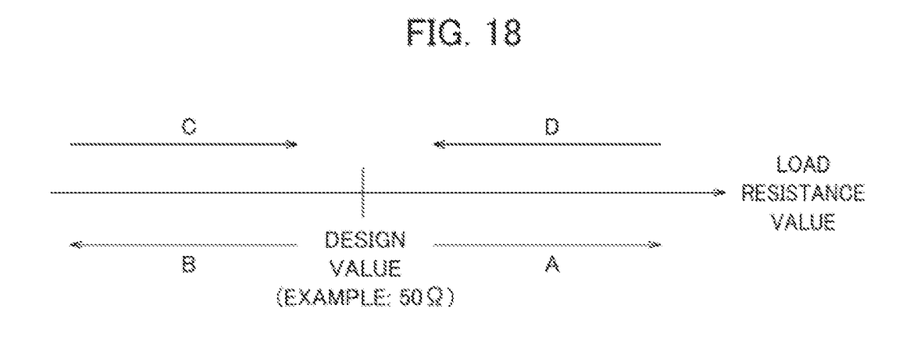
FIG. 18 is a diagram for explaining a load fluctuation in the power conversion device according to the third embodiment of the present invention.

The case of the fluctuation in the load 13 is described first. As illustrated in FIG. 17, when the input impedance Zi and the output voltage Vo is increased above the set value, and the output current Io is decreased below the set value, the controller 11 determines that this case corresponds to "change A" in which a resistance value of the load 13 is increased above the design value. For example, as illustrated in FIG. 18, the power conversion device 1 sets and determines the resistance value of the load 13 in optimum operation to 50 Ω as the design value, for example. The "change A" is a case in which the resistance value of the load 13 is increased in a direction away from the design value determined.

Further, as illustrated in FIG. 17, when the input impedance Zi and the output current Io is increased above the set value, and the output voltage Vo is decreased below the set value, the controller 11 determines that this case corresponds to "change B" as illustrated in FIG. 18. The "change B" is a case in which the resistance value of the load 13 is decreased in the direction away from the design value.

Further, as illustrated in FIG. 17, when the input impedance Zi and the output current Io is decreased below the set value, and the output voltage Vo is increased above the set value, the controller 11 determines that this case corresponds to "change C" as illustrated in FIG. 18. The "change C" is a case in which the resistance value of the load 13 is increased in the direction approaching the design value. Further, as illustrated in FIG. 17, when the input impedance Zi and the output voltage Vo is decreased below the set value, and the output current Io is increased above the set value, the controller 11 determines that this case corresponds to "change D" as illustrated in FIG. 18. The "change D" is a case in which the resistance value of the load 13 is decreased in the direction approaching the design value.

The case of the fluctuation in the input voltage is described next. As illustrated in FIG. 17, when the input impedance Zi has no change from the set value, the controller 11 determines that this case corresponds to an input fluctuation, and determines that the input voltage is increased when the output voltage Vo and the output current Io are increased above the set value. When the output voltage Vo and the output current Io are decreased below the set value, the controller 11 determines that input voltage is decreased.

As described above, when any of the change in the impedance of the rectifier capacitor 73, the fluctuation in the load 13, or the fluctuation in the input voltage is determined, the controller 11, when determining the change in the impedance, controls the drive frequency of the switching element 57. In particular, the controller 11, when determining that the impedance of the rectifier capacitor 73 is increased above the set value, increases the drive frequency of the switching element 57 to decrease the impedance of the rectifier capacitor 73. The controller 11, when determining that the impedance of the rectifier capacitor 73 is decreased below the set value, decreases the drive frequency of the switching element 57 to increase the impedance of the rectifier capacitor 73.

While FIG. 16 illustrates the case in which the power conversion device according to the present embodiment is applied to the power conversion device according to the first embodiment illustrated in FIG. 1, the power conversion device according to the present embodiment may be applied to the power conversion device according to the second embodiment illustrated in FIG. 12 or FIG. 15.

[Effects of Third Embodiment]

As described above, the power conversion device 1 according to the present embodiment can determine all of the change in the impedance of the rectifier capacitor 73, the fluctuation in the load 13, and the fluctuation in the input voltage by use of the input impedance, the output voltage, and the output current of the power conversion device 1. It could be presumed that the impedance of the rectifier capacitor 73 is not necessarily changed even though the input impedance is changed, but the input impedance may be changed in response to the fluctuation in the load 13. In view of this, the power conversion device 1 according to the present embodiment accurately makes a determination of which case is caused, the change in the impedance of the rectifier capacitor 73, or the fluctuation in the input voltage or the fluctuation in the load 13, according to the table as illustrated in FIG. 17.

Another method could also be used that measures the temperature of the rectifier capacitor 73 and estimates the amount of change in the capacitance value according to the change in the temperature. This method, however, needs to add a measurement device for measuring the temperature at a specific point. Still another method could be used that accurately estimates the change in the capacitance value according to the value of the increase in the temperature. This method also needs to preliminarily measure the characteristics including a variation in each of capacitors, and further needs to add a checking process of acquiring a relationship between the temperature and the capacitance value for each of devices to be manufactured. This requires additional components for estimating the amount of change in the capacitance value according to the change in the temperature of the rectifier capacitor 73, impeding a reduction in size of the device or a reduction in cost.

On the contrary, the power conversion device 1 according to the present embodiment detects the input voltage, the input current, the output voltage, and the output current of the power conversion device 1. Therefore, the power conversion device 1 only uses the voltage and the current of the input/output power which are typically detected. Thus, the power conversion device 1 can determine the change in the impedance of the rectifier capacitor 73 with no additional components provided for measuring the temperature. The power conversion device 1 thus can suppress the change in the impedance of the rectifier capacitor 73 with no addition of components or devices to prevent over temperature of the rectifier capacitor 73.

The power conversion device 1 according to the present embodiment also calculates the input impedance according to the input voltage and the input current, and determines that the impedance of the rectifier capacitor 73 is increased above the set value when the input impedance is decreased below the set value and the output voltage and the output current are increased above the set value. The power conversion device 1 determines that the impedance of the rectifier capacitor 73 is decreased below the set value when the input impedance is increased above the set value and the output voltage and the output current are decreased below the set value. The power conversion device 1 can determine whether the impedance of the rectifier capacitor 73 is increased above or decreased below the set value, with no addition of components or devices. The power conversion device 1 thus can suppress the change in the impedance of the rectifier capacitor 73 based on this determination, so as to prevent over temperature of the rectifier capacitor 73.

The embodiments described above are an example of the present invention. It should be understood that the present invention is not intended to be limited to these embodiments, and various modification can be made, in addition to the embodiments described above, depending on the design without departing from the scope of the technical idea of the present invention.

REFERENCE SIGNS LIST

1 POWER CONVERSION DEVICE
3 INPUT POWER SUPPLY
5 AC WAVE GENERATION CIRCUIT
7 RECTIFIER CIRCUIT
9 DETECTOR
11 CONTROLLER
13 LOAD
51 CHOKE COIL
53 RESONANT COIL
55 RESONANT CAPACITOR
57 SWITCHING ELEMENT
59 SHUNT CAPACITOR
71 DIODE
73 RECTIFIER CAPACITOR
75 FILTER COIL
77 FILTER CAPACITOR
79 RECTIFIER SWITCH

The invention claimed is:

1. A method for controlling a power conversion device comprising an alternating-current wave generation circuit configured to generate an alternating-current wave, and a rectifier circuit configured to rectify the alternating-current wave generated by the alternating-current wave generation circuit with a configuration in which a rectifier capacitor and a diode are connected in parallel, the method comprising regulating the alternating-current wave input to the rectifier capacitor depending on a change in impedance of the rectifier capacitor so as to suppress the change in the impedance of the rectifier capacitor.

2. The method for controlling the power conversion device according to claim 1, further comprising:
regulating the alternating-current wave input to the rectifier capacitor so as to decrease an output voltage of the power conversion device when the impedance of the rectifier capacitor is increased above a set value; and
regulating the alternating-current wave input to the rectifier capacitor so as to increase the output voltage of the power conversion device when the impedance of the rectifier capacitor is decreased below the set value.

3. The method for controlling the power conversion device according to claim 1, further comprising:
increasing a frequency of the alternating-current wave generated by the alternating-current wave generation circuit when the impedance of the rectifier capacitor is increased above a set value; and
decreasing the frequency of the alternating-current wave generated by the alternating-current wave generation circuit when the impedance of the rectifier capacitor is decreased below the set value.

4. The method for controlling the power conversion device according to claim 1, further comprising:
decreasing a time during which the alternating-current wave is input to the rectifier capacitor when the impedance of the rectifier capacitor is increased above a set value; and
increasing the time during which the alternating-current wave is input to the rectifier capacitor when the impedance of the rectifier capacitor is decreased below the set value.

5. The method for controlling the power conversion device according to claim 1, further comprising detecting the change in the impedance of the rectifier capacitor.

6. The method for controlling the power conversion device according to claim 1, further comprising detecting an input voltage, an input current, an output voltage, and an output current of the power conversion device.

7. The method for controlling the power conversion device according to claim 6, further comprising:
calculating an input impedance according to the input voltage and the input current;
determining that the impedance of the rectifier capacitor is increased above a set value when the input impedance is decreased below the set value and the output voltage and the output current are increased above the set value; and
determining that the impedance of the rectifier capacitor is decreased below the set value when the input impedance is increased above the set value and the output voltage and the output current are decreased below the set value.

8. A power conversion device comprising:
an alternating-current wave generation circuit configured to generate an alternating-current wave;
a rectifier circuit configured to rectify the alternating-current wave generated by the alternating-current wave generation circuit with a configuration in which a rectifier capacitor and a diode are connected in parallel; and a controller configured to control the alternating-current generation circuit and the rectifier circuit, the controller being configured to regulate the alternating-current wave input to the rectifier capacitor depending on a change in impedance of the rectifier capacitor so as to suppress the change in the impedance of the rectifier capacitor.

9. The power conversion device according to claim 8, wherein the alternating-current wave generation circuit includes a resonant circuit including a resonant coil and a resonant capacitor, and a switching element configured to turn on or off an input to the resonant circuit.

10. The power conversion device according to claim 9, wherein:

the alternating-current wave generation circuit further includes a choke coil connected between the switching element and a power supply, and a capacitor connected in parallel to the switching element; and the resonant circuit is connected to a connection point between the choke coil and the switching element.

* * * * *